United States Patent [19]
Walton

[11] 4,384,288
[45] May 17, 1983

[54] PORTABLE RADIO FREQUENCY EMITTING IDENTIFIER

[76] Inventor: Charles A. Walton, 19115 Overlook Rd., Los Gatos, Calif. 95030

[21] Appl. No.: 221,720

[22] Filed: Dec. 31, 1980

[51] Int. Cl.³ .............................. H04B 1/00; G08B 3/10
[52] U.S. Cl. ................................. 340/825.34; 235/380; 340/825.64
[58] Field of Search ............ 340/149 A, 152 T, 168 B, 340/171, 167 A, 164 R, 825.30, 348, 349, 351, 825.34, 825.21, 825.64; 235/380; 455/92, 95; 375/21–23; 370/8; 332/9, 10, 11, 14; 328/63

[56] References Cited

U.S. PATENT DOCUMENTS

| | | | |
|---|---|---|---|
| 3,641,316 | 2/1972 | Dethloff et al. | 340/149 A |
| 3,806,874 | 4/1974 | Ehrat . | |
| 3,829,833 | 8/1974 | Freeny . | |
| 3,911,397 | 10/1975 | Freeny, Jr. | 340/164 R |
| 3,943,305 | 3/1976 | Hagedorn | 340/825.52 |
| 3,988,540 | 10/1976 | Scott et al. | 332/9 |
| 4,004,228 | 1/1977 | Mullett | 455/92 |
| 4,047,107 | 9/1977 | Dickinson | 340/167 A |
| 4,083,003 | 4/1978 | Haemmig | 455/38 |
| 4,095,211 | 6/1978 | Shaughnessy | 340/167 R |
| 4,101,872 | 7/1978 | Pappas | 340/164 R |
| 4,191,948 | 3/1980 | Stockdale | 340/539 |
| 4,223,830 | 9/1980 | Walton | 235/380 |
| 4,236,068 | 11/1980 | Walton | 340/152 T |
| 4,263,591 | 4/1981 | Kemmesies | 340/825.69 |
| 4,320,522 | 3/1982 | Hayes | 340/825.71 |

OTHER PUBLICATIONS

IBM *Technical Disclosure Bulletin*, vol. 2, No. 7, Dec. 1977, p. 2525, "Externally Powered Semiconductor Transponder", B. C. Dillon et al.

*Primary Examiner*—Donald J. Yusko
*Attorney, Agent, or Firm*—Gerald L. Moore

[57] ABSTRACT

An automatic identification system wherein a portable identifier, preferably shaped like a credit card, incorporates an oscillator and encoder so as to generate a programmable pulse position-modulated signal in the radio frequency range for identification of the user. The identifier can be made to generate the identification signal constantly or can be made for stimulated transmission responsive to an interrogation signal. The identification signal can be preset or can be programmable by use of a programmable memory.

5 Claims, 5 Drawing Figures

4,384,288

PORTABLE RADIO FREQUENCY EMITTING IDENTIFIER

RELATED PATENT APPLICATIONS

U.S. Pat. No. 4,223,830, Identification System, Issued Sept. 23, 1980, with Charles A. Walton as inventor;

U.S. Pat. No. 4,236,068, Personal Identification and Signaling System, Issued Nov. 25, 1980, with Charles A. Walton as inventor;

U.S. patent application Ser. No. 06/144,901, Filed Apr. 29, 1980, Personal Identification and Signaling System, with Charles A. Walton as inventor, now abandoned.

BACKGROUND OF THE INVENTION

It is becoming increasingly necessary to quickly and accurately identify people or objects located at a terminal remote to a central processing station. Such identification is necessary for such business transactions as making financial exchanges, or for identifying remotely located objects such as cartons, boxcars or other carriers for computer controlled systems. In such systems the identification must be accurate and, to conserve computer time, done very quickly.

It is the purpose of the present invention to provide an identification system using an identifier which generates and transmits a signal for the identification of the associated user or item, which signal is in the radio frequency range and allows data communication without physical connection, and which has a shortened identification time period.

SUMMARY OF THE INVENTION

An electronic identification system comprising an identifier including an oscillator for generating a constant frequency signal in the radio frequency range, a power source for energizing the oscillator, circuit means for dividing the oscillator frequency into lower frequencies representing data rates, data cells, and portions of data cells, and circuit means for transmitting pulses at selected times representing selected data with at least some of these selected pulse times being arranged in differing orders for each user to serve as the personal identification of that user.

DESCRIPTION OF THE INVENTION

Figure 1:
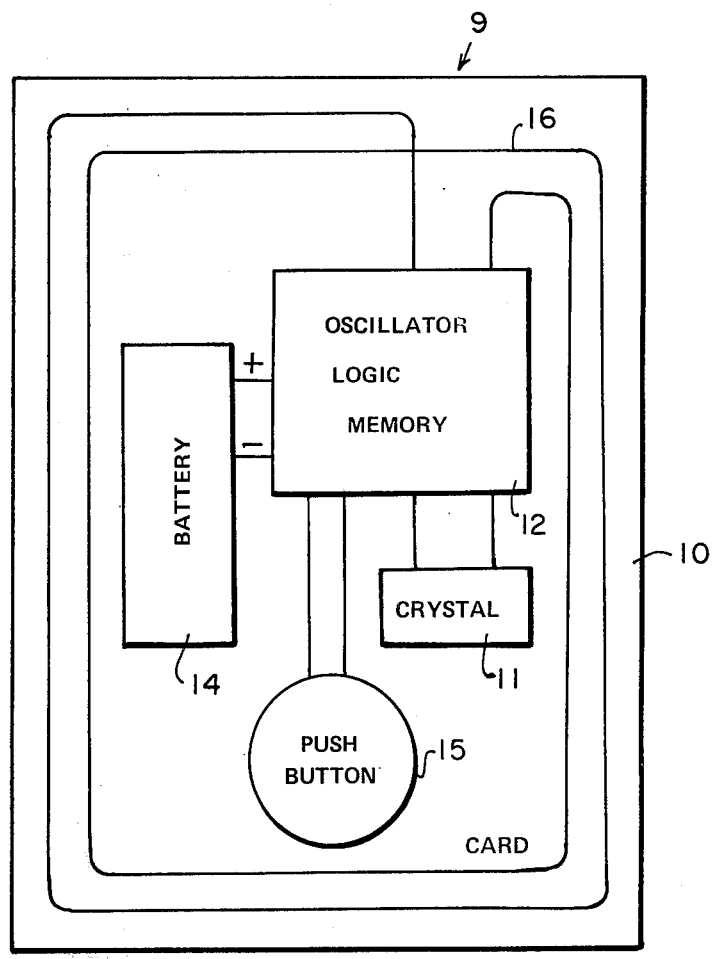
FIG. 1 is one embodiment of a portable identifier.

In FIG. 1 is shown an identifier of a type typical for use in the subject invention. Preferably this identifier 9 is shaped like a credit card so that it can easily be carried on the person or fastened to a boxcar, carton or other container which must be identified. In this embodiment a card 10 has formed thereon circuits to interconnect a crystal 11, an oscillator, logic and memory circuit chip 12, an antenna 16 and a battery 14. The battery can be of a paper type such as Model S27860 made by the Matsushita Company of Japan. A pushbutton 15 is provided as an optional means for energizing the circuit of the identifier. The loop antenna 16, preferably positioned in the card perimeter, is provided for radiating the identification signal which is generated in a manner to be described later.

Figure 2:
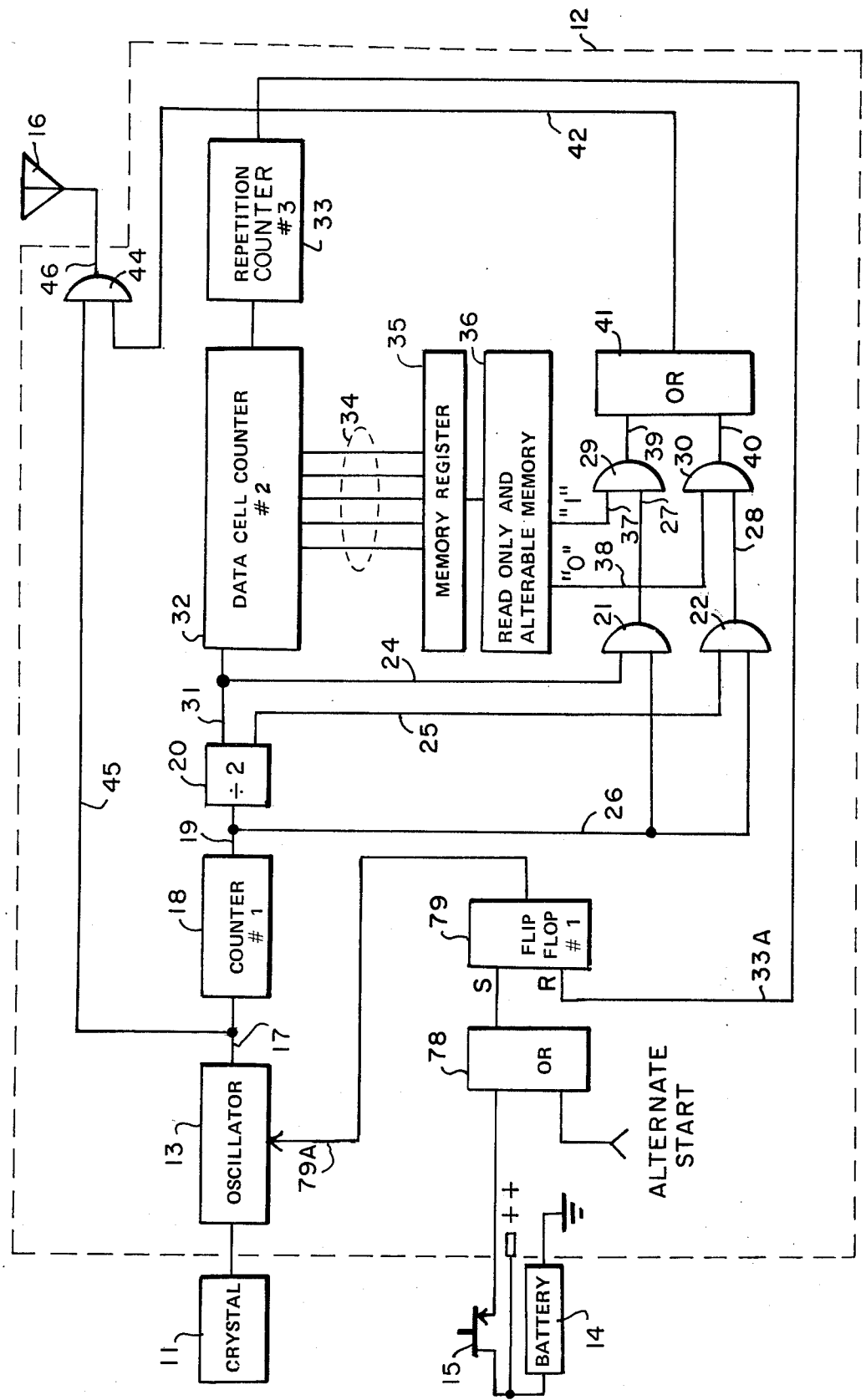
FIG. 2 is a block diagram showing the electrical circuit incorporated in the identifier of FIG. 1.

In FIG. 2 is shown the block diagram of the oscillator 13 and logic block 12. Connected thereto is the crystal 11, the pushbutton 15, the battery 14 and the antenna 16 previously described. The oscillator 13 provides a radio frequency signal which for purposes of this example is assumed to be 4 megahertz. This signal is supplied through the conductor 17 to the logic and memory which serves to divide the oscillator frequency into data cells and to divide the data cell into the half-cell times, A and B.

In accordance with a predetermined identification inserted into a memory in digital form, a pulsed signal having various timed intervals between pulses in accordance with each separate identification code is generated by the logic and transmitted to the antenna. The signal modulation is referred to as pulse position modulation or pulse time modulation.

To generate the identification signal the oscillator signal is fed through a counter 18 for reducing the frequency to one more suitable for the modulating system. In this example the counter divides the signal by 1,000 to generate a 4 kilohertz signal which is transmitted through the conductor 19 to the divider 20 and to the AND gates 21 and 22 through the conductor 26. The output of divider 20 is 2 kolohertz and its two outputs are fed over lines 24 and 25 to AND gates 21 and 22, respectively. The divider 20 provides two complementary output signals referred to herein as "A" and "B" each of which has a time duration equal to one-half of the data cell.

Figure 3:
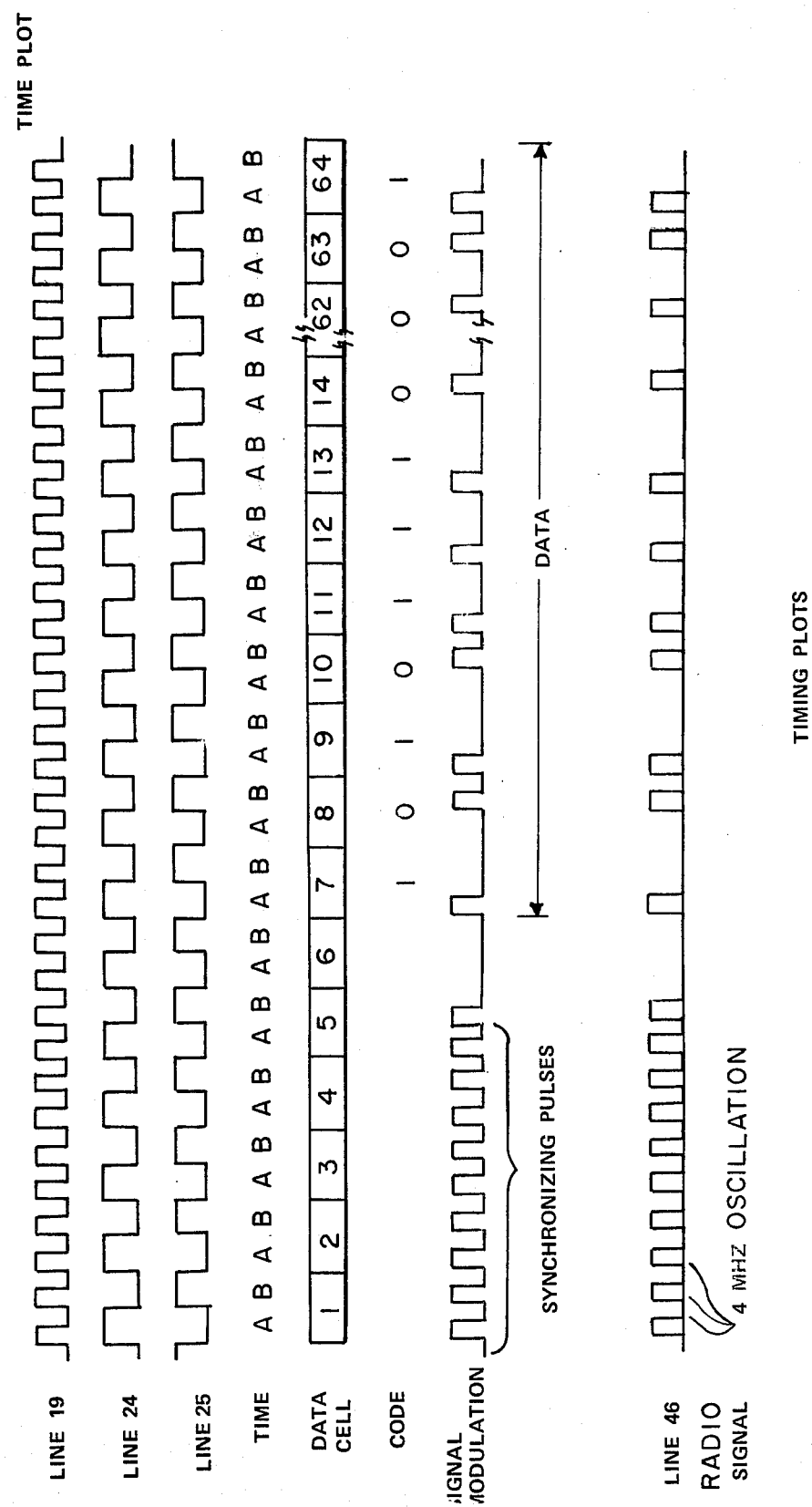
FIG. 3 shows selected waveforms generated within the circuit of FIG. 2.

The signal from the counter 18 is shown as the line 19 signal in FIG. 3. With the divider 20 dividing each data cell into two equal time intervals, the output signals of the divider are shown as Line 24 and Line 25 signals of FIG. 3.

The AND gates 21 and 22 serve to transmit a signal through the conductors 27 and 28 during alternate data periods corresponding to the time intervals "A" and "B" on the line identified as Time of FIG. 3. Accordingly the AND gates 29 and 30 are made alternately conductive since they receive the "A" and "B" signals of AND gates 21 and 22. With this arrangement the four kilohertz signal emitted from the counter 18 serves to time or strobe the signal transmission through the AND gates 29 and 30 to maintain the proper timing relationship between the original signal and the coded signal.

For coding the signal, the "A" time signal is conducted over line 31 to the data cell counter 32. Typically the data cell counter has a capacity of 64 counts corresponding to 64 data cells, for a basic data word length of 64 bits. The Data Cell Counter provides the memory address over the set of lines 34, to the memory register 35. The memory register 35 interrogates memory 36 for the value of the bit at that address. The bit may be a "1" or a "0".

The memory may be any of those available, such as random access memory (RAM), read only memory (ROM), or programmable read only memory (PROM). Interrogation of the memory by the memory register 35 causes the data output to appear on lines 37 and 38. Line 37 is "Up" and 38 is "Down" if the datum is a "1", and the converse is true for a "0".

The data is imposed on the message to be transmitted in the following way. When line 37 is Up, the AND gate 29 is half selected. The other half of AND gate 29 is half selected at "A time" by line 27 from AND gate 21. Thus there is an output on line 39 at "A time" whenever the datum is a "1". Similarly for a datum of "0", line 38 from the memory is Up and AND gate 30 is half selected. The other half of AND gate 30 is half selected at "B time" by line 28 from AND gate 22. Thus there is an output from AND gate 30 at "B time" on line 40 whenever the datum is a "0". The two timings of the data are merged in OR gate 41.

The preceding is illustrated in FIG. 3 by the various timing lines. Note that on the line marked "code", where the data values are entered, at the position of data cell number 7, the datum is a "1". In the line labeled "signal modulation" note that under data cell number 7 there is a pulse at "A time", signifying the "1". Under data cell number 8, however, the datum is "0" and the pulse occurs at "B time".

Not shown are certain refinements of logic design, known to those skilled in the art, for eliminating logic pulse "slivers", which might occur for instance, owing to slightly different time paths, from divider 20 through gates 21 and 29 to gates 29 and 30 versus the time path from divider 20 through counter 32, register 35 and memory 36.

From the OR gate 41 the conductor 42 transmits this time pulse signal to an AND gate 44 which also receives the original oscillator signal from the oscillator 12 through the conductor 45. Thus the AND gate transmits pulses of the 4 megahertz signal with the modulation responsive to the line 42 signal to the antenna 16 for transmission to a receiving unit to be described.

The time pulse signal comprises a series of 64 data cells with each data cell being divided into two intervals "A" and "B". If a pulse occurs during the first half of the data cell, i.e. during the "A" time, a "one" is indicated and if a pulse occurs during the "B" time or the second half of the data cell, a "zero" is indicated. In this manner a signal comprising a series of 1's and 0's is transmitted to indicate the identification of the user. This signal is repeated until the repetition counter 33 counts out and signals the flip-flop 79 through the line 33A to deenergize the oscillator 13.

In FIG. 3 on the line "Data Cell" is represented the cell timing, during which a pulse is inserted at "A" time or "B" time to indicate a "one" or "zero". The data cell time is one full cycle of the divider 20. On the line "Time" the "A" time and "B" time intervals are indicated.

For example if the code 10101110001 is the identification of the user as indicated on the line marked Code, the modulation of the output signal during data cell transmission is shown on the line marked Signal Modulation.

As shown, such signal modulation first includes in data cells 1 through 6 a series of time synchronizing pulses to allow the receiver to phase with the signal in a manner to be described later. Thereafter there is a pause or time separation followed by the Code transmitted during the cell periods 7 through 64. Note that output pulses occur in either the first half or the second half of the data cell. The signal appearing at the antenna 16 as conducted through the line 46 is identified in FIG. 3 as the Line 46 output identification signal.

Figure 4:
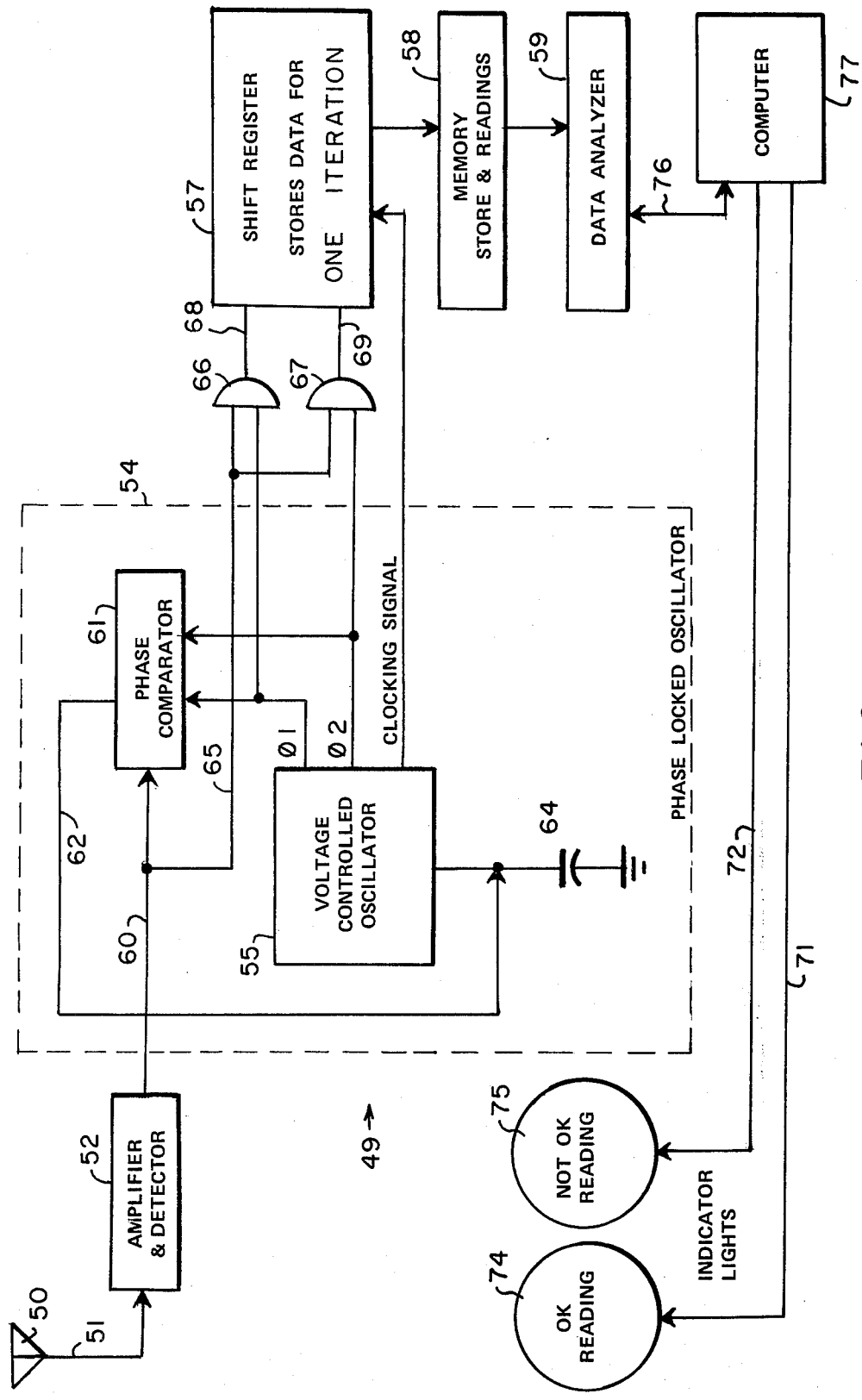
FIG. 4 is a circuit diagram of a receiving system for identifying the signal of the identifier shown in FIG. 2.

Shown in FIG. 4 is a typical receiver system 49 for receiving and identifying the Code signal generated by the identifier 9 shown in FIG. 1. The signal generated by the identifier is received by the antenna 50 and transmitted through the conductor 51 to the Amplifier and Detector 52. The amplifier would typically include automatic gain control. Thereafter a phase-locked oscillator 54 serves to correct the phasing between the signal output from the voltage controlled oscillator 55 and the signal received. The signal of the voltage controlled oscillator is the clocking signal for the circuit. The incoming code signal is first stored in the Shift Register 57. Successive data transmissions are stored in Memory Store 58. The stored data is subsequently analyzed in a Data Analyzer 59.

The signal from the amplifier 52 is transmitted through the line 60 to a Phase Comparator 61 which also receives the signal from the voltage controlled oscillator 55. The earliest or leading pulses, identified as "synchronizing pulses" in FIG. 3, are compared with the pulses from the voltage controlled oscillator and if not in phase therewith, a Phase Adjust signal is transmitted through the conductor 62 to adjust the voltage on the capacitor 64 and thus speed up or slow down the voltage controlled oscillator so that the oscillator signal is brought into phase with the incoming Code signal. Such phase adjusting circuits are well-known.

The incoming Code signal is also fed through the conductor 65 to the AND gates 66 and 67, which also receive the clocking signal from the voltage controlled oscillator 55. The voltage controlled oscillator serves in a manner complementary to the divider 20 of the identifier shown in FIG. 2, to open gate 66 during the "A" period of the data cell and thereafter open gate 67 during the "B" period of the data cell. Thus 1's and 0's are separated and transmitted to the shift register 57 through the lines 68 and 69, respectively. The shift register temporarily stores the code data for an iteration of 64 bits.

Thereafter the data is transferred to a random access memory. Typically eight 64 bit data transmissions are stored. A central processor or wired logic data analyzer 59 analyzes these transmissions to reject noise and establish the desired data. The desired data uniquely represents a particular identifier.

Next, a central memory or computer 77 is consulted to determine the suitable response. If such signal is found to be acceptable for approval, a signal is sent through line 71 to an indicator 74 showing that the reading is "OK". Similarly if no similar signal is located or if disapproval is considered desirable, a signal is sent through line 72 to an indicator 75 showing that identification was not accomplished. Such indicators 74 and 75 can be located remote to the receiver, or in some instances, located at the receiver antenna terminal to indicate the state of identification.

From the data analyzer 59 the signal is fed through the line 76 to the computer 77 for whatever purpose necessary to complete a transaction or process. Keep in mind that the identifier signal may serve as a prelude to subsequent information being transmitted, i.e. financial or other data, for use or storage in the computer. Similarly if the identifier is fixed to a package, the package is identified and thereafter the computer can signal a special routing corresponding to that identification or thereafter record the address of that item for future reference.

Figure 5:
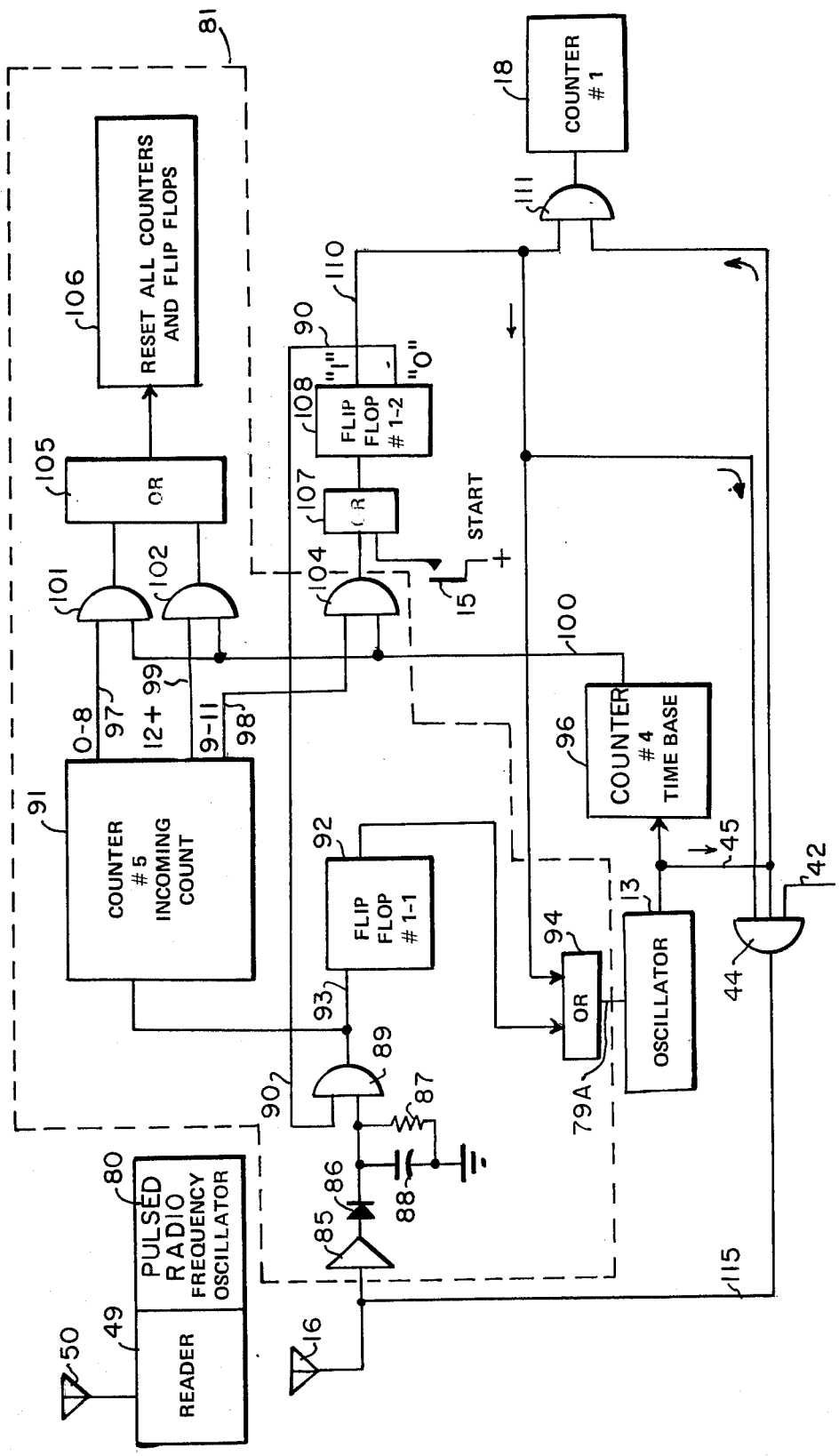
FIG. 5 is a circuit diagram of a receiving system, for incorporation into the identifier.

In the embodiment just described, the user initiates the identification cycle by depressing the switch 15 on the identifier 9. Depression of the switch results in a signal being transmitted through the OR gate 78 to set the flip-flop 79 (FIG. 2). Connected as the alternate start of FIG. 2 is the embodiment shown in FIG. 5 wherein the identifier 9 is stimulated to transmit the identification signal by the receipt of an interrogation signal from the oscillator 80 added to the reader 49. The oscillator constantly transmits a predetermined signal which, when the identifier is brought within the radiation range of that signal, will trigger the identifier to transmit the identification signal to be received by the reader so the identification procedure will be initiated. For this purpose there is shown in FIG. 5 the reader system 49 with an added pulsed radio frequency oscillator 80. The oscillator 80 serves to generate an interrogation signal comprising continuous interrogation pulses of radio frequency at a typical repetition rate of one kilohertz, for example, at a carrier frequency of 4.1 megahertz. This signal is transmitted through the antenna 50 and when an identifier to be described is brought within range of this radiated signal, the identifier is triggered to transmit the identification signal and initiate the identification process. For this purpose there is incorporated in the identifier of this type the circuit 81 shown in FIG. 5. The circuit serves to receive the receiver radiated signal and to identify it from other signals and noise. If such identification is positive, that is if the signal is one which corresponds to that sent by a typical receiver, the circuit will activate the identifier to transmit the identification signal back to the receiver. Thus the circuit 81 of FIG. 5 is incorporated into the identifier circuit of FIG. 2 in a manner to be described.

The continuous signal from the antenna 50 is received at the antenna 16 tuned to that frequency. The signal is amplified in an amplifier 85 and detected by the diode 86, the resistor 87 and the capacitor 88. Subsequently the signal is supplied to the AND gate 89 along with a signal transmitted through the conductor 90. Assuming that the signal on the conductor 90 is "up", the AND gate 89 transmits the signal through the conductor 93 to a counter 91 and a flip-flop 92. The flip-flop passes the signal to the OR gate 94 for initiation of operation of the oscillator 13 previously described. The oscillator transmits its signal to a counter 96 which proceeds to count for a fixed time period (10 milliseconds for example). In this period the counter 91 counts the incoming signal. The outputs of counter 91 represent either (a) "too few counts" 0-8 through the conductor 97, (b) the approximate "right number" of counts 9-11 through the conductor 98, or (c) "too many" 12 plus counts through the conductor 99. When the counter 96 completes its time period, a signal through the conductor 100 interrogates the counter 91 output by causing the AND gates 101, 102 and 104 to be half selected. If the count is judged either too small or too large, AND gate 101 or 102 will be conductive thereby passing a signal to the OR gate 105 which in turn activates the Reset circuit 106 for resetting all counters and flip-flops. Under these conditions it is assumed that the signal is either noise or an extraneous signal having nothing to do with the system. With all flip-flops and counters reset, the identifier is again ready to receive subsequent signals.

If the count is correct, that is, a signal appears on line 98, a response transmission is initiated as follows: The AND gate 104 passes a signal through the OR gate 107 to the flip-flop 108. When this flip-flop is operated its output "0" line 90 falls in voltage and the gate 89 is deselected. Thus no further signals can enter the flip-flop 92. The output signal "1" on line 110 rises in voltage and through the OR gate 94 maintains the oscillator 13 functioning and activates the AND gate 111 which is connected to counter 18 of the circuit of FIG. 2 to activate the circuit for sending the identification signal, and enables the gate 44 for the transmission of radio frequency signals over the line 115 to the antenna 16. This gate 44 corresponds to the same gate 44 of FIG. 2 which permits data transmission over the antenna 16. Thus it can be seen that with the identification of the interrogation signal being positive, the identifier is activated for transmitting the identification signal and such activation occurs automatically in response to the receiver signal.

The oscillator in the portable identifier of the system may be of the crystal controlled type, or it may be one whose frequency is determined by a resistance and a capacitance, or by semiconductors and capacitance. The capacitance may be the stray capacitance. At the time of manufacture, the components determining the frequency are selected or adjusted to trim the frequency to the desired value. Further the components are chosen so that as temperature or supply voltage or other factors vary in value, the components also change or stabilize in such a way that the frequency is constant and relatively independent of temperature or other variables. Such a design is less costly than a crystal controlled oscillator. The frequency stability is not as good as a crystal controlled oscillator, but is good enough in most applications for the low energy application.

In the receiving system, there can be incorporated a phase locked oscillator, capable of locking onto the radio frequency portion of the transmission, so that perfect synchronization of the transmission and receiving system occurs. This level of precision may not be necessary, but is possible with the present state of the art, and may be helpful in establishing overall reliability.

While not shown in the drawings, there are several ways to monitor and recharge the battery 14 in the portable identifier 9. One way is to allocate one bit of the data string to report on battery status. The bit may be a "0" if the charge level is satisfactory, and a "1" if the charge is low. When a "1" is detected by the reader, the reader will signal that the battery is low, and the user will then either change the battery, change the identifier, or plug in the identifier for a recharge.

Another way to charge the batteries is initiated when the reader has completed a satisfactory reception of the card data. The reader then switches to a high level of radiation at a selected frequency, and pumps charge back into the battery. Thus, the reader need only radiate when an identifier is near and the battery of the identifier is kept constantly up to a high level of charge by being recharged automatically.

The invention claimed is:
1. An electronic identification system comprising:
   a portable identifier having electrical circuits including:
   an oscillator for generating a constant frequency signal in the radio frequency range;
   a power source for energizing said circuits;
   a switching circuit connecting said oscillator to transmit said constant frequency signal;

first circuit means for dividing said constant frequency signal down to a lower data cell rate to generate a lower data cell rate signal;

means to store a predetermined code representing the identification of said identifier, said code consisting of a first series of bits each of which have the value of one or zero;

second circuit means for dividing said data cells of said lower rate signal into equal halves called beginning and ending halves;

means to transmit said predetermined code to said switching circuit;

means causing said switching circuit to conduct during the beginning data cell half if a code bit is one value and to not conduct if of the other value and means to cause said switching circuit to conduct during the ending data cell half if the code is the other value and not to conduct if it is the one value;

means to advance the code through all the bits and thereby cause the switching circuit to conduct and not conduct responsively and thereby generate an identifier signal radiated by said antenna means;

an antenna for radiating said identifier signal to points remote to said identifier;

a receiver having an antenna to receive said radiated identifier signal and indicate the identity of said identifier by converting said radio frequency signal back to said predetermined code.

2. An electronic identification system as defined in claim 1 wherein said code includes a time interval preceding said first series of bits during which a first series of pulses of duration equal to one-quarter of the size of a data cell are transmitted such that one of said pulses appears in each half of said data cells and said code also includes an interval following said first series of bits during which a second series of pulses is transmitted; and said receiver includes a phase locked oscillator which synchronizes on said first and second series of pulses.

3. An electronic identification system as defined in claim 2 wherein said phase locked oscillator includes means for synchronizing with said first and second series of pulses and said first series of bits.

4. An electronic identification system as defined in claim 1 wherein said power source comprises means to generate energy for said circuits from inductively coupled power pulses, and said receiver includes means to transmit inductively coupled power pulses.

5. An electronic identification system as defined in claim 1 wherein said identifier includes means to cause generation and radiation of said identifier signal responsive to a transmit signal; and;

said receiver includes means to generate and transmit to said identifier a transmit signal.

* * * * *